United States Patent
Ide et al.

(10) Patent No.: US 7,799,719 B2
(45) Date of Patent: Sep. 21, 2010

(54) CERAMIC MEMBER AND CORROSION-RESISTING MEMBER

(75) Inventors: Takayuki Ide, Fukuoka (JP); Masami Ando, Fukuoka (JP)

(73) Assignee: Toto Ltd., Fukuoka (JP)

( * ) Notice: Subject to any disclaimer, the term of this patent is extended or adjusted under 35 U.S.C. 154(b) by 248 days.

(21) Appl. No.: 12/009,146

(22) Filed: Jan. 16, 2008

(65) Prior Publication Data

US 2008/0176735 A1 Jul. 24, 2008

(30) Foreign Application Priority Data

Jan. 17, 2007 (JP) ............................. 2007-008481
Dec. 28, 2007 (JP) ............................. 2007-339364

(51) Int. Cl.
*C04B 35/505* (2006.01)

(52) U.S. Cl. ..................................................... 501/152

(58) Field of Classification Search .................. 501/152
See application file for complete search history.

(56) References Cited

U.S. PATENT DOCUMENTS

| | | | |
|---|---|---|---|
| 4,098,612 A | | 7/1978 | Rhodes et al. |
| 4,761,390 A * | | 8/1988 | Hartnett et al. ............. 501/152 |
| 5,004,712 A * | | 4/1991 | Borglum ..................... 264/2.1 |
| 5,075,267 A * | | 12/1991 | Fujii et al. .................. 501/126 |
| 7,375,046 B2 * | | 5/2008 | Aihara et al. ............... 501/152 |
| 7,407,904 B2 * | | 8/2008 | Ide et al. .................... 501/152 |
| 7,442,450 B2 * | | 10/2008 | Aihara et al. ............... 428/698 |
| 7,476,634 B2 * | | 1/2009 | Nagasaka et al. ........... 501/152 |
| 7,566,408 B2 * | | 7/2009 | Lee et al. ............. 252/301.4 R |
| 7,566,675 B2 * | | 7/2009 | Ide et al. .................... 501/152 |
| 2003/0232221 A1 * | | 12/2003 | Yamada et al. ............. 428/697 |
| 2004/0109808 A1 * | | 6/2004 | Lee et al. .................... 423/263 |
| 2006/0199722 A1 * | | 9/2006 | Aihara et al. ............... 501/97.2 |
| 2007/0105708 A1 * | | 5/2007 | Fujita et al. ................ 501/152 |

FOREIGN PATENT DOCUMENTS

| | | |
|---|---|---|
| JP | 04-055368 | 2/1992 |
| JP | 04-059658 | 2/1992 |

(Continued)

OTHER PUBLICATIONS

"JIS Handbook Ceramics", first edition, pp. 40 and 41, issued on Apr. 21, 1999. * partial English translation of p. 41.

*Primary Examiner*—Karl E Group
(74) *Attorney, Agent, or Firm*—Carrier, Blackman & Associates, P.C.; Joseph P. Carrier; William D. Blackman

(57) ABSTRACT

A ceramic member having a high density, small grain diameter, and excellent plasma resistance is provided. The ceramic member is constituted of a fine structure composed of fine grains, which is a ceramic member comprising an yttria as a main component and obtained through firing, wherein the ceramic member has an open porosity, as determined through a measurement by the Archimedes method, of less than 0.5%. By diminishing open voids, sites which is an origin of plasma erosion can be diminished. Thus, a ceramic member having excellent plasma resistance can be provided. By inhibiting abnormal grain growth to form a ceramic member constituted of stall grains, particle contamination by dusting can be reduced. Thus, plasma resistance and preventing particulate contamination can be improved.

11 Claims, 2 Drawing Sheets

FOREIGN PATENT DOCUMENTS

| | | |
|---|---|---|
| JP | 04-238864 | 8/1992 |
| JP | 05-170534 | 7/1993 |
| JP | 10-273364 | 10/1998 |
| JP | 11-214365 | 8/1999 |
| JP | 2000-159572 | 6/2000 |
| JP | 2000-239065 | 9/2000 |
| JP | 2001-181042 | 7/2001 |
| JP | 2002-255647 | 9/2002 |
| JP | 2003-055050 | 2/2003 |
| JP | 2004-296910 | 10/2004 |
| JP | 2005-008482 | 1/2005 |
| JP | 2005008482 * | 1/2005 |
| JP | 2006-021990 | 1/2006 |
| JP | 2006-225185 | 8/2006 |
| WO | WO 2005/009919 | 2/2005 |

\* cited by examiner

CERAMIC MEMBER AND CORROSION-RESISTING MEMBER

CROSS-REFERENCE TO RELATED APPLICATIONS

This application claims priority from Japanese Patent Applications No. 2007-008481 filed on Jan. 17, 2007 and No. 2007-339364 filed on Dec. 28, 2007, the entire subject matter of which is incorporated herein by reference.

BACKGROUND OF THE INVENTION

1. Field of the Invention

Embodiments of the invention generally relate to a corrosion-resisting member for use in a treating apparatus for treating a substrate to be treated, and further relate to a ceramic member having excellent plasma resistance and particulate contamination prevention properties.

2. Description of the Related Art

Members disposed inside the chamber of a semiconductor or liquid-crystal production apparatus are located in a plasma treatment apparatus into which a fluorine- or chlorine-containing gas is introduced, and materials having high plasma resistance are desired. Many high-purity ceramic materials such as, e.g., high-purity aluminum oxide have been proposed as materials having high plasma resistance. In recent years, an yttria is attracting attention as a material having excellent plasma resistance. It has been pointed out that dusting occurs during etching due to member erosion and this dust adheres to the substrate being treated, resulting in particle contamination. Because of this, members having high plasma resistance and constituted of fine grains have been proposed, and materials reduced in grain boundary erosion and having a small impurity amount have been proposed.

In general, ceramics necessitate high temperature during firing for the production thereof and are hence produced through sintering, which is accompanied with grain growth. It is known that the ceramics yielded hence have a grain diameter lager than the particle diameter of the starting materials.

Ceramics constituted of large grains are known to be apt to suffer particle shedding.

It is also known that in case where a ceramic has voids in a portion to be exposed to a plasma, these voids serve as each of which is an origin of plasma erosion, resulting in poor plasma resistance.

Conventional techniques for producing a plasma resistant member include a method in which grain diameter is reduced to diminish particle shedding and a method in which a sintered body is produced so as to have a reduced porosity. An yttria is a material difficult to sinter and, hence, firing at a high temperature is necessary for obtaining a dense sintered body. Because of this, grain growth proceeds and this makes it impossible to obtain a sintered body constituted of grains with a small diameter. For example, JP-A-2006-21990 discloses that when a raw-material powder having an average particle diameter of 0.7 μm was used and firing was conducted at 1,700° C., then an yttria sintered body having an average grain diameter of 4 μm and a bulk density of 4.90 g/cm$^3$ was obtained.

Furthermore, JP-A-2005-8482 discloses that when a raw-material powder having an average particle diameter of 1.2 μm was used, then firing at 1, 650° C. gave an yttria sintered body having an average grain diameter of 2 μm and a bulk density of 4.64 g/cm$^3$, and firing at 1,710° C. gave an yttria sintered body having an average grain diameter of 12 μm and a bulk density of 4.90 g/cm$^3$. It can be seen from these that for producing a dense yttria sintered body by an ordinary firing method, it is necessary to conduct firing at a temperature of 1,700° C. or higher.

SUMMARY OF THE INVENTION

An embodiment of the invention is intended to provide a ceramic member which is constituted of small grains, therefore is less apt to suffer particle shedding and has excellent plasma resistance by inhibiting abnormal grain growth therein and reducing amount of voids.

In order to accomplish that object, the invention provides, in one embodiment thereof, a ceramic member comprising an yttria as a main component and obtained through firing, wherein the ceramic member has an open porosity, as determined through a measurement by the Archimedes method, of less than 0.5%. Thus, plasma resistance and particulate contamination prevention properties can be improved.

The invention provides, in another embodiment thereof, a ceramic member comprising an yttria as a main component and obtained through firing, wherein grains constituting the ceramic member have an average grain diameter of smaller than 1.5 μm and the ceramic member has an open porosity, as determined through a measurement by the Archimedes method, of less than 0.5%. Thus, plasma resistance and particulate contamination prevention properties can be improved.

The invention provides, in still another embodiment thereof, a ceramic member comprising an yttria as a main component and obtained through firing, wherein grains constituting the ceramic member have a maximum grain diameter of smaller than 3 μm and the ceramic member has an open porosity, as determined through a measurement by the Archimedes method, of less than 0.5%. Thus, plasma resistance and particulate contamination prevention properties can be improved.

In a preferred embodiment of the invention, the ceramic members comprising an yttria as a main component and obtained through firing, contain $Y_3BO_6$. Thus, plasma resistance and particulate contamination prevention properties can be improved.

In another preferred embodiment of the invention, the ceramic members comprising an yttria as a main component and obtained through firing have a thickness of 0.3 mm or larger.

The invention further provides a corrosion-resisting member which comprises the ceramic member according to one embodiment of the invention, the ceramic member being disposed in a position where corrosion resistance is required.

According to the invention, sites which are an origin of plasma erosion can be diminished by reducing the amount of open voids, whereby a ceramic member having excellent plasma resistance can be provided. In addition, abnormal grain growth is inhibited to produce a ceramic member constituted of small grains, whereby particle contamination due to dusting can be reduced.

DETAILED DESCRIPTION OF THE INVENTION

Figure 1:
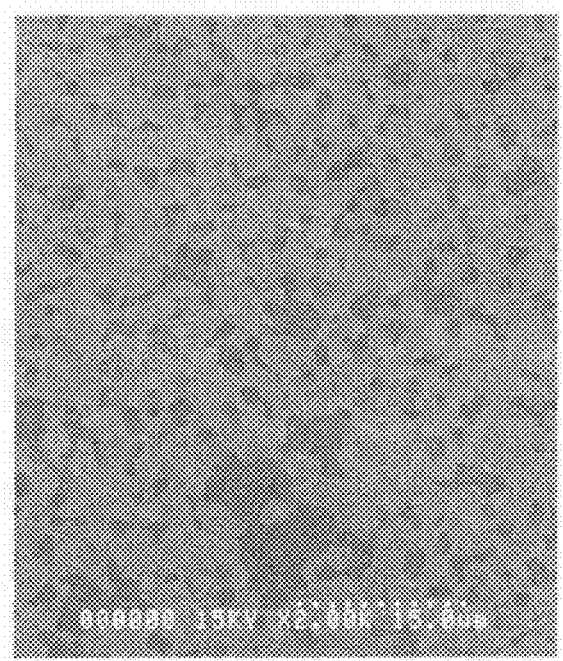
FIG. 1 is a drawing of an electron photomicrograph showing the surface state, before plasma irradiation, of the ceramic member of one Example according to the invention.

Terms used in this invention are explained below.

(Ceramic Member)

The term ceramic member as used in the invention means a ceramic member obtained by firing an yttria powder. The surfaces of the ceramic member may be any of a sintered surface, a polished/ground surface, etc. The phrase "comprising an yttria as a main component" means that an yttrium element accounts for a large proportion of the metallic elements constituting the ceramic member. The phrase "an yttrium element accounts for a large proportion of the metallic elements constituting the ceramic member" means that the content of yttrium element in the ceramic member is generally 50% by weight or higher, preferably 93% by weight or higher, more preferably 95% by weight or higher, based on all metallic elements constituting the ceramic member.

(Grain Diameter)

The grain diameter in the invention is the size of the individual solid crystal grains constituting the ceramic member. That term means the size of the individual grains in the ceramic member which are separated from one another by grain boundaries.

(Average Grain Diameter)

The term average grain diameter in the invention means a value calculated by the planimetric method. In determining average grain diameter, a sample was mirror-polished, subsequently subjected to thermal etching in the air, and examined with an SEM to obtain an image, and the average grain diameter was calculated by the planimetric method using the SEM image.

(Planimetric Method)

Average grain diameter in the invention was determined by Jeffries's planimetric method. (Reference: Z. Jeffries, *Chem. Met. Engrs.*, 16, 503-504 (1917); ibid., 18, 185 (1918).) Arbitrarily selected 2-3 sites in a sample which has undergone thermal etching are examined with an SEM to take SEN photographs thereof at a magnification of 10,000. A circle having a known area (A) is drawn on each photograph, and the number of grains per unit area $N_G$ is determined from the number of grains present within the circle $n_c$ and the number of grains present on the circle periphery $n_i$ using the following equation.

$$N_G = (n_c + 1/2 n_i)/(A/10,000^2)$$

$1/N_G$ is the area occupied by one grain. An equivalent-circle diameter (D) was calculated from the value using the following equation, and this value was taken as average grain diameter.

$$D = 2/(\pi N_G)^{1/2}$$

(Thermal Etching)

Thermal etching in the invention is a process in which a sample is mirror-polished, subsequently heated at a rate of 300° C./h to a temperature lower than the firing temperature by 300-400° C., held at this temperature for 10-30 minutes, and then allowed to cool in the oven. In this heat treatment, the individual grains expand thermally and contract upon cooling to form recesses at the grain boundaries. These recesses enable a grain size examination.

(Maximum Grain Diameter)

The term maximum grain diameter in the invention means a size obtained by examining with an SEM a sample which has undergone thermal etching to obtain an SEM image thereof at a magnification of 10,000 and determining the maximum diameter in a certain direction (Krumbein diameter) of a maximum grain observed.

(Archimedes Method)

The term Archimedes method in the invention means the density-determining method as provided for in JIS (JIS R 1634). The evacuation method was used for saturation with water, and distilled water was used as the liquid medium to make a measurement. The term open voids means voids present in the sample surface. The amount of open voids can be measured by the Archimedes method and is expressed as an open porosity. The open porosity to be determined means the percentage proportion of the volume of open-void parts to the outer-shape volume of the sample which is taken as 1.

(Specific Surface Area)

The term specific surface area used in the invention for indicating the particle diameter of a raw-material powder is one determined by the BET method as provided for in JIS (JIS R 1626).

It is well known that it is necessary to diminish voids for improving plasma resistance. Although a treatment for diminishing voids by HIP is generally known, large voids of several micrometers or larger present in a sintered body which has undergone densification are difficult to be removed. Consequently, it is necessary to diminish voids during sintering.

It is generally said that the size of voids in a sintered body is about 1/10 the diameter of the grains constituting the sintered body. It is known that the following relationship holds among the critical diameter of the grains constituting a sintered body, average void diameter, and void volume.

$$D = d/f$$

D: critical diameter of constituent grains d: average diameter of voids f: volume of voids For reducing the volume of voids, it is necessary to reduce the size of voids. For attaining this, it is necessary to reduce the size of sinter-constituting grains and simultaneously inhibit abnormal grain growth to thereby produce a sinter constituted of homogeneous grains. However, grain growth during sintering is indispensable for densification acceleration and void removal, and some degree of grain growth is necessary.

In one embodiment of the invention, at least either of the following requirements is preferably satisfied: the average grain diameter is smaller than 1.5 μm; and the maximum grain diameter is smaller than 3 μm. It was found that this case is more effective in diminishing voids in the sinter.

From the standpoint of preventing particulate contamination, it is desirable to further reduce the average grain diameter and the maximum grain diameter. However, from the standpoint of easily producing a dense ceramic member, it is preferred that the average grain diameter and the maximum grain diameter each should be 0.1 μm or larger. The movement of particles for constituting a ceramic member depends on temperature and also on the temperature at which sintering is accelerated. In the invention, critical values were found which can be judged to be a constituent-grain size region where both of sufficient sintering and a fine structure can be attained.

In one embodiment of the invention, the ceramic member comprising an yttria as a main component and obtained through firing has a open porosity, as determined by the Archimedes method, of less than 0.5%, preferably 0.3% or lower. Thus, plasma resistance and preventing particulate contamination can be improved. Theoretically, the open porosity is most preferably 0%. Consequently, it is preferred that the open porosity should be 0% or higher.

In another embodiment of the invention, a ceramic member comprising an yttria as a main component and obtained through firing is obtained which is characterized in that the grains constituting this ceramic member have an average grain diameter smaller than 1.5 μm, preferably 1 μm or smaller, and that the open porosity, as determined by the Archimedes method, is less than 0.5%, preferably 0.3% or less. Thus, a ceramic member which is dense and is constituted of fine grains and reduced in voids is obtained. From the standpoint of easily producing a dense ceramic member, the average grain diameter is more preferably 0.1 μm or larger. Theoretically, the open porosity is most preferably 0%. Consequently, it is preferred that the open porosity should be 0% or higher.

In still another embodiment of the invention, the ceramic member comprising an yttria as a main component and obtained through firing is characterized in that the grains constituting this ceramic member have a maximum grain diameter smaller than 3 μm, preferably 1.5 μm or smaller, and that the open porosity, as determined by the Archimedes method, is less than 0.5%, preferably 0.3% or less. Thus, a ceramic member which is dense and is constituted of fine grains and reduced in voids is obtained.

From the standpoint of easily producing a dense ceramic member, the maximum grain diameter is more preferably 0.1 μm or larger.

Theoretically, the open porosity is most preferably 0%. Consequently, it is preferred that the open porosity should be 0% or higher.

Furthermore, in the ceramic member comprising an yttria as a main component and obtained through firing, the thickness of the ceramic member is preferably 0.3 mm or larger, more preferably 1 mm or larger. By regulating the ceramic member so as to be thick, it can be used in a corrosive environment over a long time period. From the standpoint of ease of production, the thickness of the ceramic member is preferably 10 cm or smaller. The term thickness herein means the depth-direction thickness as measured from that surface of the ceramic member which is exposed at least to a plasma atmosphere or a corrosive environment.

Examples of the shape of the ceramic member include platy, sheet-form, rod-form, spherical, domy, trapezoidal, cylindrical, hollow, and rib-form shapes. The ceramic member may have a complicated shape composed of a combination of two or more of these. The surface shape of the ceramic member may be smooth or rugged.

In a preferred embodiment of the invention, an yttria powder is molded and the green body is fired at 1,200-1,600° C., preferably 1,400-1,550° C., more preferably 1,400-1,500° C., and then optionally ground/polished. By firing the green body at such temperature, grain growth is inhibited and a ceramic member constituted of fine grains can be obtained.

More preferably, an aid which forms a liquid phase at that temperature is added to the yttria. The addition of such a sintering aid can enhance degree of sintering and facilitates sintering at that temperature.

Preferred examples of the aid include boron compounds such as boron oxide and boric acid, lithium compounds such as lithium fluoride, and potassium compounds such as potassium fluoride. It is most preferred to add a boron compound.

(Mixing/Raw-Material Powder)

For mixing raw materials, use can be made of a general technique employed in steps for producing ceramics, such as a ball mill. Although the particle diameter of a raw yttria powder is not particularly limited, it is preferably 10 μm or smaller, more preferably 2 μm or smaller, on the average.

The lower limit of the particle diameter is not limited. However, the lower limit thereof is preferably about on the order of submicron because too small particle diameters may result in a decrease in moldability. A mixing method involving a pulverization step, such as mixing with a ball mill, is preferred from the standpoint of obtaining a ceramic member constituted of homogeneous fine grains, because this mixing not only reduces the particle diameter but also has the effect of pulverizing coarse particles.

(Molding)

In a molding method in an embodiment of the invention, a powder which has been granulated can be molded by a dry molding technique such as press molding or CIP to obtain a green body. Molding techniques are not limited to dry molding, and use can be made of molding techniques such as extrusion molding, injection molding, sheet forming, slip casting, and gel casting to obtain a molded object. In the case of dry molding, use may be made of granules obtained by adding a binder to the raw powder and granulating the mixture with a spray dryer or the like.

(Firing)

In an embodiment of the invention, firing can be conducted in the air at a temperature lower than 1,600° C., and firing can be conducted with an electric furnace having an SiC heating element or Kanthal heating element. The atmosphere for firing is not limited to the air, and firing in an inert atmosphere such as nitrogen or argon or in a vacuum is possible. A firing period can be selected in the range of 0.5-8 hours. A firing temperature can be selected in the range of 1,200-1,600° C. It is desirable to conduct firing preferably at 1,400-1,550° C., more preferably at 1,400-1,500° C. By fixing the green body at this temperature, grain growth is inhibited and a ceramic member constituted of fine grains is obtained.

In the case where a boron compound has been incorporated into the ceramic member in order to enhance degree of sintering, the boron compound is apt to vaporize off during firing. It is therefore preferred to provide a muffle or the like in firing the green body. During firing, the boron compound forms $Y_3BO_6$, which forms a liquid phase at a temperature of 1,100-1,600° C. to accelerate sintering. This formation of a $Y_3BO_6$ liquid phase and the low-temperature firing inhibit the growth of ceramic grains. Thus, a ceramic member constituted of fine grains can be obtained.

The sintered body obtained can be subjected to HIP in a range of temperatures not higher than the firing temperature. As a result, a dense sintered body which has an open porosity of less than 0.1%, more preferably less than 0.05%, and has an almost theoretical density can be obtained.

The boron compound which forms $Y_3BO_6$ crystals is not limited to boron oxide, and use can be made of a boron compound such as, e.g., boric acid, boron nitride, boron carbide, $YBO_3$, or $Y_3BO_6$. Preferred of these are boron oxide, boric acid, and $YBO_3$.

The ceramic member obtained was mirror-polished, heated at a rate of 300° C./h to a temperature lower than the firing temperature by 300-400° C., and held at that temperature for 10-30 minutes to conduct thermal etching. The sample obtained can be examined with an SEM for grain shape.

The ceramic member obtained according to the invention can be used in those members for a semiconductor or liquid-crystal production apparatus which are exposed to a plasma atmosphere, such as a chamber, bell-jar, susceptor, clamp ring, focus ring, capture ring, shadow ring, insulating ring, liner, dummy wafer, tube for generating a high-frequency plasma, dome for generating a high-frequency plasma, lift pin for supporting a semiconductor wafer, shower plate, baffle plate, bellows cover, upper electrode, lower electrode, screw for fixing a member in the chamber, screw cap, and robot arm. For example, in the case of a chamber or a bell-jar, the ceramic member is used on the inner wall side where plasma irradiation is conducted. In the case of a focus ring or a capture ring, the ceramic member can be used on the side which comes into contact with a plasma atmosphere. In the other members also, the ceramic member can be used on the side which is exposed to a plasma atmosphere.

The ceramic member of the invention may have a volume resistivity of $10^{14}\Omega\cdot cm$ or higher. This ceramic member can hence be utilized in electrostatic chucks in, e.g., an etching apparatus for the microprocessing of a semiconductor wafer or quartz wafer.

Furthermore, the ceramic member of the invention can be used as a corrosion-preventive member such as, e.g., a transport pipe for transporting a corrosive solution or corrosive gas, e.g., hydrogen fluoride, or the like, or as a crucible for use in, e.g., chemical treatments with a corrosive solution.

EXAMPLES

An yttria powder (specific surface area, 11-15 g/cm$^3$) and boron oxide (reagent grade) were prepared as raw materials. The boron oxide was added in amounts of 0-8 wt %, and a dispersant, a binder, and release agent were added thereto. Each mixture was subjected to a pulverization/stirring/mixing treatment with a ball mill. After the mixing, each mixture was granulated with a spray dryer. The granule powder obtained was press-molded and then subjected to CIP molding. The granulation with a spray dryer and the CIP treatment improve the density of green body, and this enables fired bodies to be stably obtained. Each green body obtained was degreased and then fired in the air at 1,400-1,500° C. Table 1 shows the sintered bodies obtained and the relationship among average grain diameter, maximum grain diameter, and an open porosity.

Examples 1 to 5 show the results of tests in which boron addition amount was varied. The sintered bodies have average grain diameters in the range of 0.2-1.5 μm and are constituted of exceedingly fine grains. The maximum grain diameters thereof are not larger than 3 μm, showing that the sintered bodies are constituted of fine grains having a narrow grain size distribution. Because of this, the sintered bodies each had an open porosity as low as 0.24% or less.

COMPARATIVE EXAMPLES

Comparative Example 1 shows the results of a test in which a sample containing no boron was fired at 1,600° C. This sintered body is constituted of exceedingly small grains with an average grain diameter of 0.35 μm. However, it has an open porosity of 0.76% and has a large amount of voids. This sintered body has a maximum grain diameter as small as 0.8 μm.

Comparative Example 2 is a system in which boron was added in an amount of 8 wt %. In Comparative Example 2, abnormally grown grains were observed. The sintered body was constituted of grains including large ones exceeding 3 μm. Although it was ascertained in the Examples given above that some degree of grain growth is necessary for sintering, it was ascertained that excessive grain growth tends to inhibit sintering. Because of this, the sintered body had a large amount of voids and had an open porosity as high as 24%.

Comparative Example 3 shows the case where a raw powder having a specific surface area of 35-45 m$^2$/g was used. The sintered body obtained through firing at 1,400° C. in the air had a bulk density of 3.87 g/cm$^3$, showing that densification was slightly insufficient. Despite this, the constituent grains had an average grain diameter of 0.26 μm, showing that grain growth had occurred. However, the maximum grain diameter thereof is about 0.7 μm, showing that the grain growth had not proceeded to such a degree that sufficient sintering was attained. Because of this, the sinter is not sufficiently dense.

The results given above show the following. That a sintered body is constituted of fine grains having an average grain diameter of 0.2-1.5 μm and simultaneously satisfies that any abnormally grown grains present in the sintered body are smaller than 3 μm is effective in diminishing open voids, which can serve as sites which are origins of plasma erosion, and is effective in plasma resistance. Such properties are effective also in preventing particulate contamination because this sintered body is constituted of fine grains.

For the purpose of evaluating the plasma resistance of the ceramic member of the invention, the sintered bodies of

TABLE 1

|  | Specific surface area of raw material m$^2$/g | Amount of boron added wt % | Primary-burning temperature ° C. | Average particle diameter μm | Maximum particle diameter μm | Open Porosity % | Bulk density g/cm$^3$ |
| --- | --- | --- | --- | --- | --- | --- | --- |
| Example 1 | 11-15 | 0.02 | 1450 | 0.41 | 2.0 | 0.24 | 4.65 |
| Example 2 | 11-15 | 0.1 | 1500 | 0.54 | 1.5 | 0.06 | 4.90 |
| Example 3 | 11-15 | 1 | 1480 | 0.26 | 1.5 | 0.05 | 4.98 |
| Example 4 | 11-15 | 3 | 1500 | 0.39 | 1.5 | 0.05 | 4.93 |
| Example 5 | 11-15 | 5 | 1420 | 1.03 | 2.5 | 0.06 | 4.90 |
| Comparative Example 1 | 11-15 | 0 | 1600 | 0.35 | 0.8 | 0.76 | 4.76 |
| Comparative Example 2 | 11-15 | 8 | 1420 | 1.75 | 3.5 | 24 | 3.63 |
| Comparative Example 3 | 35-45 | 0 | 1400 | 0.26 | 0.7 | 20 | 3.87 |

Figure 2:
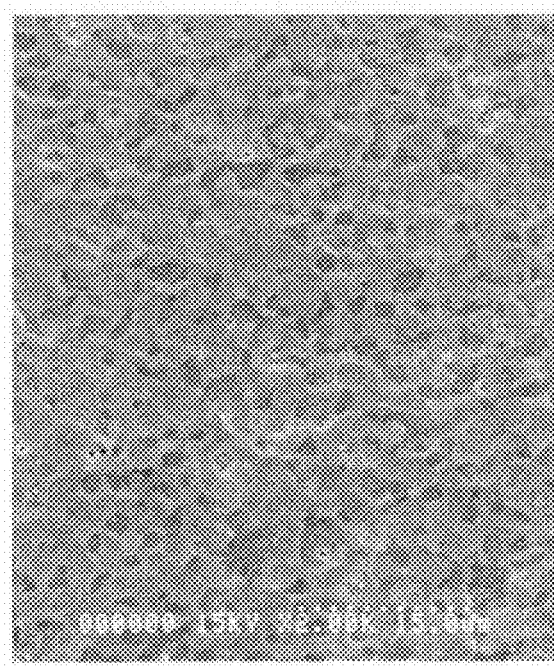
FIG. 2 is a drawing of an electron photomicrograph showing the surface state, after plasma irradiation, of the ceramic member of the Example according to the invention.
Figure 3:
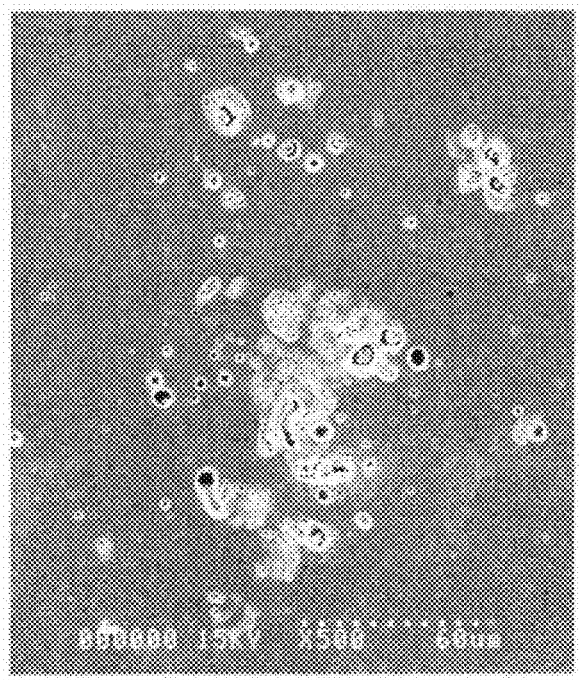
FIG. 3 is a drawing of an electron photomicrograph showing the surface state, before plasma irradiation, of the ceramic member shown in Comparative Example 1.
Figure 4:
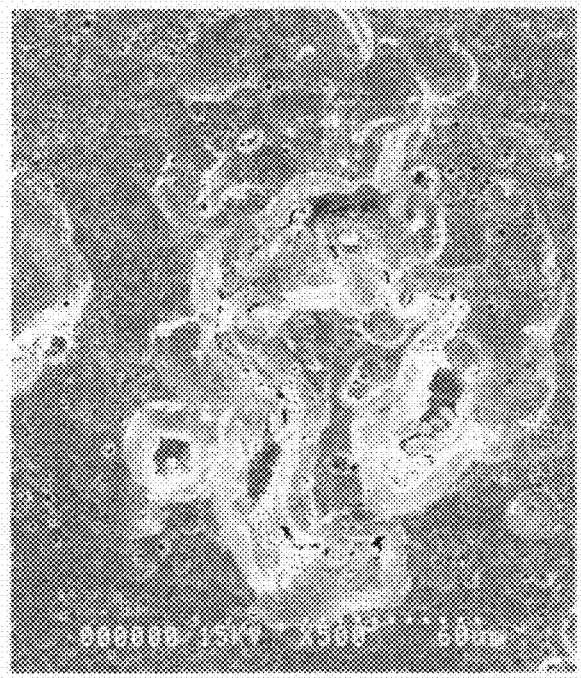
FIG. 4 is a drawing of an electron photomicrograph showing the surface state, after plasma irradiation, of the ceramic member shown in Comparative Example 1.

Example 4 and Comparative Example 1 were subjected to a 30-hour plasma irradiation treatment with a reactive ion etching apparatus (DEA-506; Anelva Corp.) at 1,000 W using $CF_4$ (40 sccm)+$O_2$ (10 sccm) as an etching gas. The results are shown in FIGS. 1 to 4. It was ascertained that the sintered body of the Example had an exceedingly satisfactory surface shape even after the plasma irradiation as compared with the sintered body of the Comparative Example.

What is claimed is:

1. A ceramic member comprising an yttria as a main component and obtained through firing, wherein the ceramic member has an open porosity, as determined through a measurement by the Archimedes method, of less than 0.5%, wherein grains constituting the ceramic member have an average grain diameter of smaller than 1.5 μm, wherein the content of yttrium element is 93% by weight or higher of all metallic elements in the ceramic member, and wherein the ceramic member contains $Y_3BO_6$.

2. A ceramic member comprising an yttria as a main component and obtained through firing, wherein the ceramic member has an open porosity, as determined through a measurement by the Archimedes method, of less than 0.5%, wherein grains constituting the ceramic member have a maximum grain diameter of smaller than 3 μm, wherein the grains constituting the ceramic member have an average grain diameter of smaller than 1.5 μm, wherein the content of yttrium element is 93% by weight or higher of all metallic elements in the ceramic member, and wherein the ceramic member contains $Y_3BO_6$.

3. A ceramic member comprising an yttria as a main component and obtained through firing, wherein the ceramic member has an open porosity, as determined through a measurement by the Archimedes method, of less than 0.5%, wherein grains constituting the ceramic member have an average grain diameter of smaller than 1.5 μm, and wherein the ceramic member contains $Y_3BO_6$.

4. The ceramic member of claim 1, wherein the ceramic member has a thickness of 0.3 mm or larger.

5. A corrosion-resisting member comprising the ceramic member of claim 1, wherein the ceramic member is disposed in a position where corrosion resistance is required.

6. The ceramic member of claim 2, wherein the ceramic member has a thickness of 0.3 mm or larger.

7. A corrosion-resisting member comprising the ceramic member of claim 2, wherein the ceramic member is disposed in a position where corrosion resistance is required.

8. A ceramic member of claim 1, wherein the ceramic member is sintered at a temperature of $\leq 1600°$ C.

9. A ceramic member of claim 2, wherein the ceramic member is sintered at a temperature of $\leq 1600°$ C.

10. A ceramic member of claim 8, wherein after the ceramic member is sintered, it is subjected to hot isostatic pressing in a temperature range not exceeding the sintering temperature.

11. A ceramic member of claim 9, wherein after the ceramic member is sintered, it is subjected to hot isostatic pressing in a temperature range not exceeding the sintering temperature.

* * * * *